US009517962B2

(12) United States Patent
Takeda et al.

(10) Patent No.: US 9,517,962 B2
(45) Date of Patent: Dec. 13, 2016

(54) PLATE-SHAPED OBJECT PROCESSING METHOD

(71) Applicant: DISCO CORPORATION, Tokyo (JP)

(72) Inventors: Noboru Takeda, Tokyo (JP); Hiroshi Morikazu, Tokyo (JP); Xiaoming Qiu, Tokyo (JP); Fumiteru Tashino, Tokyo (JP); Ken Togashi, Tokyo (JP)

(73) Assignee: Disco Corporation, Tokyo (JP)

( * ) Notice: Subject to any disclaimer, the term of this patent is extended or adjusted under 35 U.S.C. 154(b) by 33 days.

(21) Appl. No.: 14/660,146

(22) Filed: Mar. 17, 2015

(65) Prior Publication Data

US 2015/0259235 A1    Sep. 17, 2015

(30) Foreign Application Priority Data

Mar. 17, 2014  (JP) ................................ 2014-053409

(51) Int. Cl.
 *C03B 33/02* (2006.01)
 *B23K 26/00* (2014.01)
 (Continued)

(52) U.S. Cl.
 CPC ........... *C03B 33/0222* (2013.01); *B23K 20/10* (2013.01); *B23K 26/0006* (2013.01);
 (Continued)

(58) Field of Classification Search
 CPC ..... C03B 33/02; C03B 33/0222; B23K 26/00; B23K 26/0057; B23K 26/0039
 (Continued)

(56) References Cited

U.S. PATENT DOCUMENTS 3,930,825 A * 1/1976 Chui ....................... C03B 21/06
                                                    65/105
4,467,168 A * 8/1984 Morgan ................ C03B 33/082
                                                    219/121.67
(Continued)

FOREIGN PATENT DOCUMENTS

| JP | 2012-148955 | 8/2012 |
| JP | 2013-071854 | 4/2013 |
| JP | 2013-091582 | 5/2013 |

OTHER PUBLICATIONS

U.S. Appl. No. 14/725,773, filed May 29, 2015.
(Continued)

*Primary Examiner* — Samuel M Heinrich
(74) *Attorney, Agent, or Firm* — Greer Burns & Crain Ltd.

(57) ABSTRACT

A plate-shaped object processing method forms a through hole of a desired shape in a plate-shaped object. The method includes a through hole contour forming step of performing laser processing within the plate-shaped object along a contour of the through hole to be formed, by positioning, within the plate-shaped object, a focal point of a pulsed laser beam of a wavelength capable of passing through the plate-shaped object. The beam is applied along the contour of the through hole to be formed by a pulsed laser beam irradiation unit including a condenser applying the laser beams. A through hole is formed by breaking the laser-processed contour of the through hole and forming the through hole by positioning an ultrasonic transducer of an ultrasonic wave applying unit in correspondence with the contour of the through hole to be formed, and applying an ultrasonic wave.

4 Claims, 7 Drawing Sheets

(51) Int. Cl.
*B23K 20/10* (2006.01)
*B23K 26/03* (2006.01)
*B23K 26/08* (2014.01)
*C03B 33/033* (2006.01)
*C03B 33/04* (2006.01)

(52) U.S. Cl.
CPC .......... *B23K 26/0057* (2013.01); *B23K 26/03* (2013.01); *B23K 26/0624* (2015.10); *B23K 26/0853* (2013.01); *B23K 26/364* (2015.10); *B23K 26/384* (2015.10); *C03B 33/033* (2013.01); *B23K 2201/40* (2013.01); *B23K 2203/52* (2015.10); *B65G 2249/04* (2013.01); *C03B 33/04* (2013.01)

(58) Field of Classification Search
USPC ...... 219/121.67–121.72, 121.85; 65/62, 174, 65/269
See application file for complete search history.

(56) References Cited

U.S. PATENT DOCUMENTS

| | | | | |
|---|---|---|---|---|
| 5,387,776 A | * | 2/1995 | Preiser | ................ B28D 5/0011 |
| | | | | 219/121.72 |
| 6,204,472 B1 | * | 3/2001 | Muzzi | ................ B23K 26/0823 |
| | | | | 219/121.67 |
| 6,512,196 B1 | * | 1/2003 | Yoon | ................ B23K 26/0823 |
| | | | | 219/121.67 |
| 8,264,144 B2 | * | 9/2012 | Oikawa | ................ H01L 51/003 |
| | | | | 313/506 |
| 2003/0134734 A1 | * | 7/2003 | Nishimoto | ............ C03B 11/088 |
| | | | | 501/69 |
| 2009/0081851 A1 | | 3/2009 | Sakamoto et al. | |
| 2009/0250446 A1 | | 10/2009 | Sakamoto | |
| 2013/0216779 A1 | | 8/2013 | Hofmeister et al. | |
| 2013/0247615 A1 | | 9/2013 | Boek et al. | |
| 2014/0199519 A1 | | 7/2014 | Schillinger et al. | |
| 2015/0034613 A1 | | 2/2015 | Hosseini | |
| 2015/0164689 A1 | | 6/2015 | Vogel et al. | |
| 2015/0165548 A1 | | 6/2015 | Marjanovic et al. | |
| 2015/0165560 A1 | | 6/2015 | Hackert et al. | |
| 2015/0165562 A1 | | 6/2015 | Marjanovic et al. | |
| 2015/0165563 A1 | | 6/2015 | Manley et al. | |
| 2015/0166391 A1 | * | 6/2015 | Marjanovic | ......... C03B 33/0222 |
| | | | | 428/43 |
| 2015/0166393 A1 | | 6/2015 | Marjanovic et al. | |
| 2015/0166394 A1 | | 6/2015 | Marjanovic et al. | |
| 2015/0166396 A1 | | 6/2015 | Marjanovic et al. | |
| 2015/0232369 A1 | | 8/2015 | Marjanovic et al. | |
| 2015/0259235 A1 | | 9/2015 | Takeda et al. | |
| 2015/0299018 A1 | | 10/2015 | Bhuyan et al. | |
| 2015/0375336 A9 | * | 12/2015 | Webster | ................ A61B 18/20 |
| | | | | 419/1 |
| 2016/0060156 A1 | | 3/2016 | Krueger et al. | |

OTHER PUBLICATIONS

Corning Gorilla Glass Product Data Sheet—https://web.archive.org/web/20121030233349/http://www.valleydesign.com/Datasheets/Corning%20Gorilla%20Glass.pdf—(Available online Oct. 30, 2012).

* cited by examiner

PLATE-SHAPED OBJECT PROCESSING METHOD

BACKGROUND OF THE INVENTION

Field of the Invention

The present invention relates to a plate-shaped object processing method forming a through hole of a desired shape in a plate-shaped object such as a glass substrate or the like.

Description of the Related Art

The operating screen of a smart phone or the like is formed by a glass substrate, and various kinds of application programs can be selected while the screen is viewed. The glass substrate used as such an operating screen is provided with a through hole for a purpose of installation of a speaker or a camera. Japanese Patent Laid-Open No. 2013-91582 describes, as a method forming the through hole in the glass substrate described above, a method of forming a hole by performing sandblasting and etching the periphery of the hole.

SUMMARY OF THE INVENTION

However, sandblasting and etching processing take a long time, and thus result in poor productivity.

It is accordingly an object of the present invention to provide a plate-shaped object processing method that can efficiently form a through hole of a desired shape in a plate-shaped object such as a glass substrate or the like.

In accordance with an aspect of the present invention, there is provided a plate-shaped object processing method forming a through hole of a desired shape in a plate-shaped object, the plate-shaped object processing method including: a through hole contour forming step of performing laser processing within the plate-shaped object along a contour of the through hole to be formed, by positioning, within the plate-shaped object, a focal point of a pulsed laser beam of a wavelength capable of passing through the plate-shaped object and applying the pulsed laser beam along the contour of the through hole to be formed by pulsed laser beam irradiation means including a condenser applying the laser beam; and a through hole forming step of breaking the laser-processed contour of the through hole to be formed and forming the through hole in the plate-shaped object by positioning an ultrasonic transducer of ultrasonic wave applying means in correspondence with the contour of the through hole to be formed in the plate-shaped object resulting from the through hole contour forming step and applying an ultrasonic wave.

Preferably, a value obtained by dividing a numerical aperture (NA) of a condensing lens of the condenser by an index of refraction (N) of the plate-shaped object is set in a range of 0.05 to 0.2, and the through hole contour forming step forms, along the contour of the through hole to be formed, shield tunnels in which pores and amorphous substances shielding the pores are grown between the focal point and a side on which the pulsed laser beam is made incident in the plate-shaped object, by positioning the focal point of the pulsed laser beam within the plate-shaped object and applying the pulsed laser beam along the contour of the through hole to be formed.

Preferably, the plate-shaped object is a quartz glass substrate, and the numerical aperture (NA) of the condensing lens of the condenser is set in a range of 0.1 to 0.025. Alternatively, the plate-shaped object is a sapphire substrate, and the numerical aperture (NA) of the condensing lens of the condenser is set in a range of 0.1 to 0.035.

The plate-shaped object processing method according to the present invention includes: a through hole contour forming step of performing laser processing within a plate-shaped object along a contour of a through hole to be formed, by positioning, within the plate-shaped object, a focal point of a pulsed laser beam of a wavelength capable of passing through the plate-shaped object and applying the pulsed laser beam along the contour of the through hole to be formed by pulsed laser beam irradiation means including a condenser applying the laser beam; and a through hole forming step of breaking the laser-processed contour of the through hole to be formed and forming the through hole in the plate-shaped object by positioning an ultrasonic transducer of ultrasonic wave applying means in correspondence with the contour of the through hole to be formed in the plate-shaped object resulting from the through hole contour forming step and applying an ultrasonic wave. Thus, a through hole of a desired shape can be formed in a shorter time as compared with the conventional processing method.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
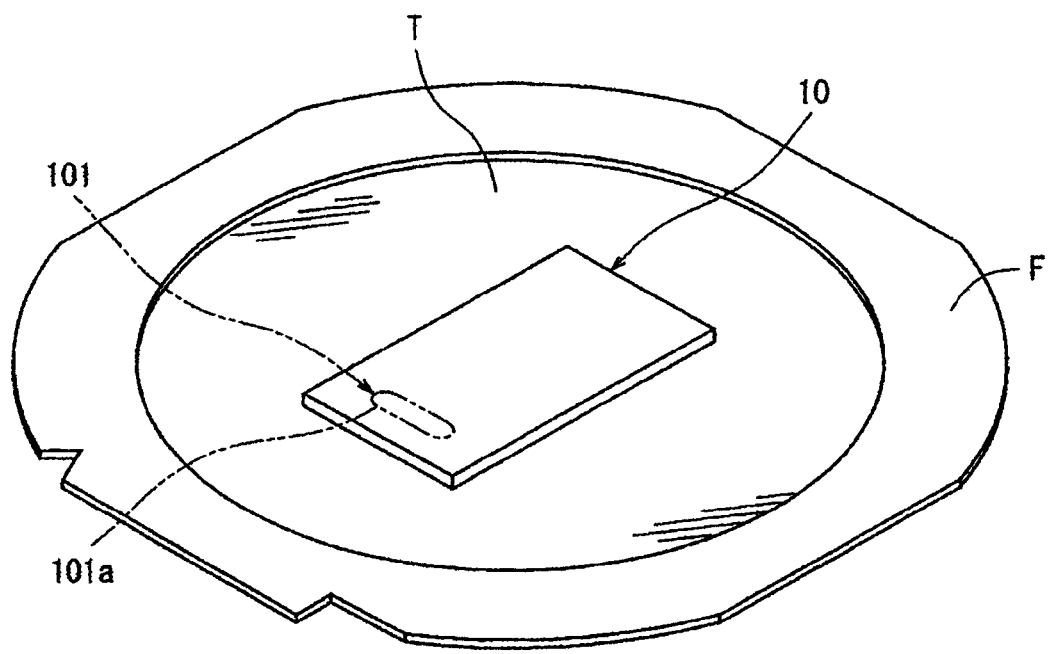
FIG. 1 is a perspective view showing a state in which a plate-shaped object to be processed by a plate-shaped object processing method according to the present invention is stuck to a dicing tape fitted to an annular frame.

A preferred embodiment of a plate-shaped object processing method according to the present invention will hereinafter be described in further detail with reference to the accompanying drawings. FIG. 1 is a perspective view of a quartz glass substrate as a plate-shaped object processed by the plate-shaped object processing method according to the present invention. A plate-shaped object 10 shown in FIG. 1 is formed in a rectangular shape having a thickness of 500 μm. A contour 101 of a through hole to be formed and a processing start position 101a are marked on the top surface of the plate-shaped object 10. The thus formed plate-shaped object 10 made of a quartz glass substrate or a sapphire substrate is stuck to the top surface of a protective tape T fitted to an annular frame F.

Figure 2:
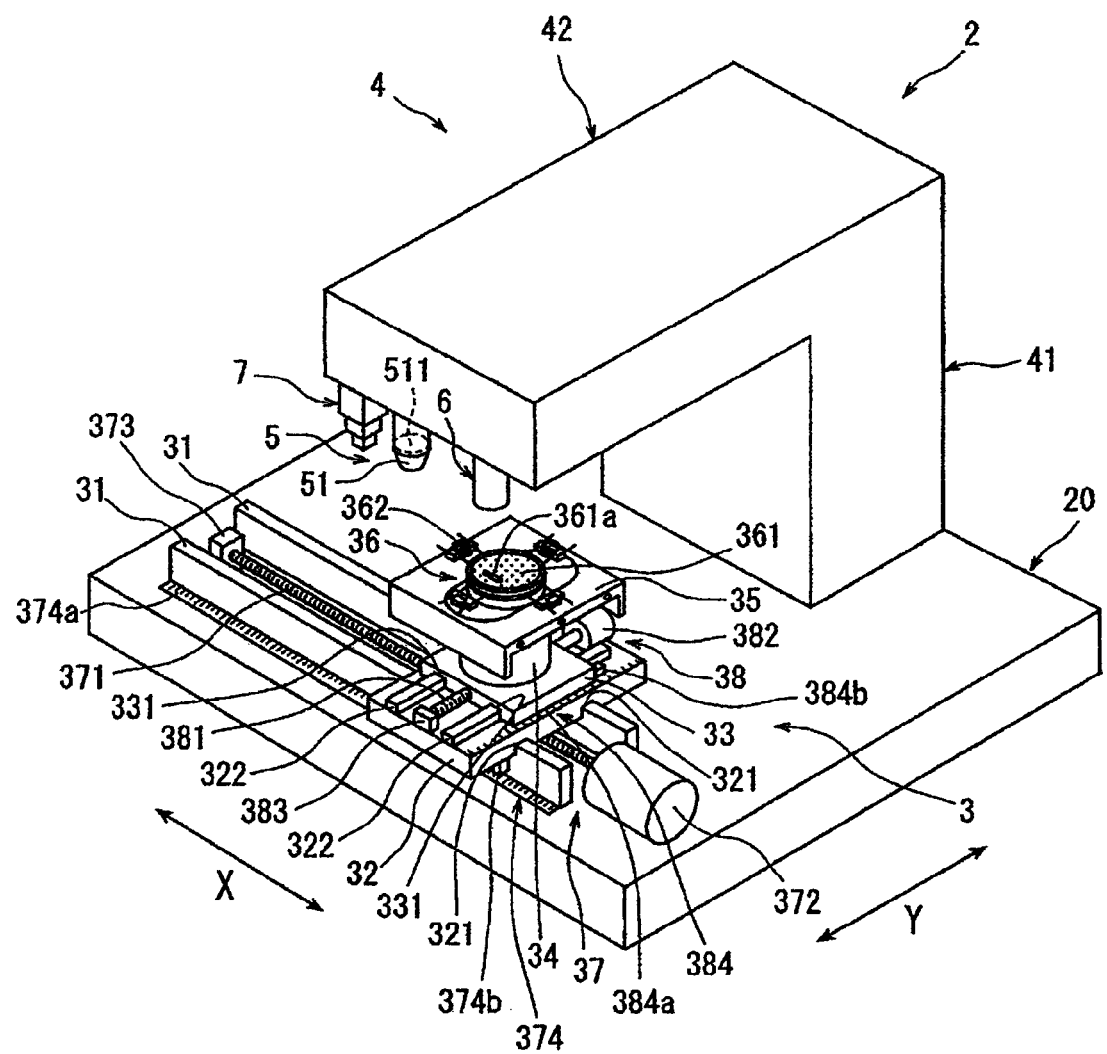
FIG. 2 is a perspective view of a processing apparatus for carrying out the plate-shaped object processing method according to the present invention.

FIG. 2 is a perspective view of a processing apparatus for carrying out the plate-shaped object processing method according to the present invention. A processing apparatus 2 shown in FIG. 2 includes a stationary base 20, a chuck table mechanism 3 for holding a workpiece, the chuck table mechanism 3 being disposed on the stationary base 20 so as to be movable in an X-axis direction indicated by an arrow X, and a laser beam irradiation unit 4 as laser beam irradiation means disposed on the base 20.

The chuck table mechanism 3 includes: a pair of guide rails 31 arranged on the stationary base 20 in parallel with each other along the X-axis direction; a first sliding block 32 disposed on the guide rails 31 so as to be movable in the X-axis direction; a second sliding block 33 disposed on the first sliding block 32 so as to be movable in a Y-axis direction indicated by an arrow Y orthogonal to the X-axis direction; a support table 35 supported over the second sliding block 33 by a cylindrical member 34; and a chuck table 36 as workpiece holding means. The chuck table 36 has a suction chuck 361 formed of a porous material. Suction means not shown in the figures is actuated to suck and hold the plate-shaped object 10 as a workpiece onto a holding surface as the top surface of the suction chuck 361 via the protective tape T. Incidentally, the suction chuck 361 in the present embodiment is provided with a relief recessed portion 361a slightly larger than the contour 101 of the through hole to be formed which contour 101 is marked on the plate-shaped object 10. The thus formed chuck table 36 is rotated by a pulse motor not shown in the figures which pulse motor is disposed within the cylindrical member 34. Incidentally, the chuck table 36 is provided with a clamp 362 for fixing the annular frame F that supports the workpiece such as the plate-shaped object 10 or the like via the protective tape T.

The first sliding block 32 is provided with a pair of guided grooves 321 in an undersurface thereof, the pair of guided grooves 321 being fitted to the pair of guide rails 31, and is provided with a pair of guide rails 322 on a top surface thereof, the pair of guide rails 322 being formed in parallel with each other along the Y-axis direction. The thus formed first sliding block 32 is formed so as to be movable in the X-axis direction along the pair of guide rails 31 by fitting the guided grooves 321 to the pair of guide rails 31. The chuck table mechanism 3 in the present embodiment has first processing feed means 37 for moving the first sliding block 32 in the X-axis direction along the pair of guide rails 31. The first processing feed means 37 includes a male screw rod 371 disposed between and in parallel with the pair of guide rails 31 and a driving source such as a pulse motor 372 or the like for rotation-driving the male screw rod 371. One end of the male screw rod 371 is rotatably supported by a bearing block 373 fixed to the stationary base 2. Another end of the male screw rod 371 is transmissively coupled to the output shaft of the pulse motor 372. Incidentally, the male screw rod 371 is screwed into a through female screw hole formed in a female screw block not shown in the figure which female screw block is provided in a projecting manner on the undersurface of a central portion of the first sliding block 32. Hence, the first sliding block 32 is moved in the X-axis direction along the guide rails 31 by driving the male screw rod 371 for normal rotation and reverse rotation by the pulse motor 372.

The processing apparatus 2 in the present embodiment has X-axis direction position detecting means 374 for detecting the X-axis direction position of the chuck table 36. The X-axis direction position detecting means 374 includes a linear scale 374a disposed along the guide rails 31 and a read head 374b provided to the first sliding block 32 and moving along the linear scale 374a together with the first sliding block 32. The read head 374b of the X-axis direction position detecting means 374 sends a pulse signal of one pulse per µm in the present embodiment to control means to be described later. The control means to be described later detects the X-axis direction position of the chuck table 36 by counting the input pulse signal. Incidentally, when the pulse motor 372 is used as the driving source of the first processing feed means 37, the X-axis direction position of the chuck table 36 can also be detected by counting driving pulses of the control means to be described later which control means outputs a driving signal to the pulse motor 372. In addition, when a servomotor is used as the driving source of the first processing feed means 37, the X-axis direction position of the chuck table 36 can also be detected by sending a pulse signal output by a rotary encoder detecting the rotational speed of the servomotor to the control means not shown in the figures, and counting the input pulse signal by the control means.

The second sliding block 33 is provided with a pair of guided grooves 331 in an undersurface thereof, the pair of guided grooves 331 being fitted to the pair of guide rails 322 provided on the top surface of the first sliding block 32. The second sliding block 33 is formed so as to be movable in the Y-axis direction by fitting the guided grooves 331 to the pair of guide rails 322. The chuck table mechanism 3 in the present embodiment includes second processing feed means 38 for moving the second sliding block 33 in the Y-axis direction along the pair of guide rails 322 provided on the first sliding block 32. The second processing feed means 38 includes a male screw rod 381 disposed between and in parallel with the pair of guide rails 322 and a driving source such as a pulse motor 382 or the like for rotation-driving the male screw rod 381. One end of the male screw rod 381 is rotatably supported by a bearing block 383 fixed to the top surface of the first sliding block 32. Another end of the male screw rod 381 is transmissively coupled to the output shaft of the pulse motor 382. Incidentally, the male screw rod 381 is screwed into a through female screw hole formed in a female screw block not shown in the figures which female screw block is provided in a projecting manner on the undersurface of a central portion of the second sliding block 33. Hence, the second sliding block 33 is moved in the Y-axis direction along the guide rails 322 by driving the male screw rod 381 for normal rotation and reverse rotation by the pulse motor 382.

The processing apparatus 2 in the present embodiment has Y-axis direction position detecting means 384 for detecting the Y-axis direction position of the second sliding block 33. The Y-axis direction position detecting means 384 includes a linear scale 384a disposed along the guide rails 322 and a read head 384b provided to the second sliding block 33 and moving along the linear scale 384a together with the second sliding block 33. The read head 384b of the Y-axis direction position detecting means 384 sends a pulse signal of one pulse per µm in the present embodiment to the control means to be described later. The control means to be described later detects the Y-axis direction position of the chuck table 36 by counting the input pulse signal. Incidentally, when the pulse motor 382 is used as the driving source of the second processing feed means 38, the Y-axis direction position of the chuck table 36 can also be detected by counting driving pulses of the control means to be described later which control means outputs a driving signal to the pulse motor 382. In addition, when a servomotor is used as the driving source of the second processing feed means 38, the Y-axis direction position of the chuck table 36 can also be detected by sending a pulse signal output by a rotary encoder detecting the rotational speed of the servomotor to the control means not shown in the figures, and counting the input pulse signal by the control means.

The laser beam irradiation unit 4 includes: a supporting member 41 disposed on the stationary base 20; a casing 42 supported by the supporting member 41 and extending substantially horizontally; laser beam irradiation means 5 provided to the casing 42; and imaging means 6 for detecting a processing region to be laser-processed, the imaging means 6 being disposed on a front end portion of the casing 42.

The laser beam irradiation means 5 includes: pulsed laser beam oscillating means including a pulsed laser oscillator such as a YAG pulsed laser oscillator or the like and repetition frequency setting means, the pulsed laser beam oscillating means being disposed within the casing 42 and not being shown in the figures; and a condenser 51 including a condensing lens 511 for condensing a pulsed laser beam oscillated by the not shown pulsed laser beam oscillating means disposed in the front end portion of the casing 42. The condensing lens 511 of the condenser 51 has a numerical aperture (NA) set as follows. The numerical aperture (NA) of the condensing lens 511 is set such that a value obtained by dividing the numerical aperture (NA) by an index of refraction (N) of a single crystal substrate is in a range of 0.05 to 0.2 (numerical aperture setting step). Incidentally, the laser beam irradiation means 5 includes focal point position adjusting means (not shown) for adjusting the focal point position of the pulsed laser beam condensed by the condensing lens 511 of the condenser 51.

The imaging means 6 mounted on the front end portion of the casing 42 provided with the laser beam irradiation means 5 includes illuminating means for illuminating a workpiece, an optical system capturing a region illuminated by the illuminating means, an imaging element (CCD) imaging an image captured by the optical system, and the like. The imaging means 6 sends the imaged image signal to the control means not shown in the figures.

Figure 3:
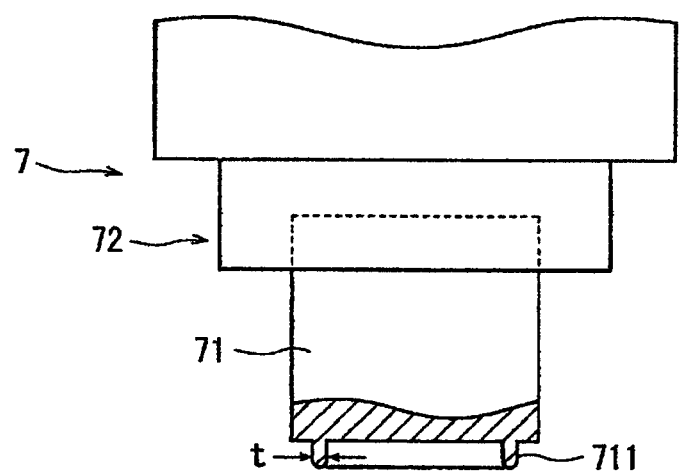
FIG. 3 is a front view of ultrasonic wave applying means provided to the processing apparatus shown in FIG. 2.

Ultrasonic wave applying means 7 is disposed on the front end portion of the casing 42 forming the laser beam irradiation unit 4. As shown in FIG. 3, the ultrasonic wave applying means 7 has an ultrasonic transducer 71. The ultrasonic transducer 71 is moved by raising and lowering means 72 in a direction perpendicular to the holding surface of the chuck table 36. A vibrating terminal 711 corresponding to the contour 101 of the through hole to be formed which contour 101 is marked on the plate-shaped object 10 is provided at a lower end of the ultrasonic transducer 71. The projection width (t) of the vibrating terminal 711 is set at 0.15 mm in the present embodiment. Incidentally, the vibrating terminal 711 in the present embodiment is formed of titanium, which is light and has an excellent property of following the vibration of the ultrasonic transducer 71.

The processing apparatus 2 is formed as described above. Description will be made of a method of forming a through hole along the contour 101 of the through hole to be formed which contour 101 is marked on the plate-shaped object 10 that has been subjected to the above-described wafer supporting step. Incidentally, a memory forming the control means of the processing apparatus 2 which control means is not shown in the figures stores the coordinates of the contour 101 of the through hole to be formed and the processing start position 101a. In order to form the through hole along the contour 101 of the through hole to be formed which contour 101 is marked on the plate-shaped object 10, a through hole contour forming step is performed first which performs laser processing within the plate-shaped object 10 along the contour 101 of the through hole to be formed, by positioning, within the plate-shaped object 10, the focal point of the pulsed laser beam of a wavelength capable of passing through the plate-shaped object 10 as a workpiece, and applying the pulsed laser beam along the contour 101 of the through hole to be formed. In order to perform this through hole contour forming step, the side of the protective tape T to which the plate-shaped object 10 is stuck is first mounted on the chuck table 36 of the processing apparatus 2 shown in FIG. 2 described above. At this time, the contour 101 of the through hole to be formed which contour 101 is marked on the plate-shaped object 10 is positioned at a position corresponding to the relief recessed portion 361a provided in the suction chuck 361. Then, the suction means not shown in the figure is actuated to hold the plate-shaped object 10 on the suction chuck 361 via the protective tape T (wafer holding step).

Figure 4A:
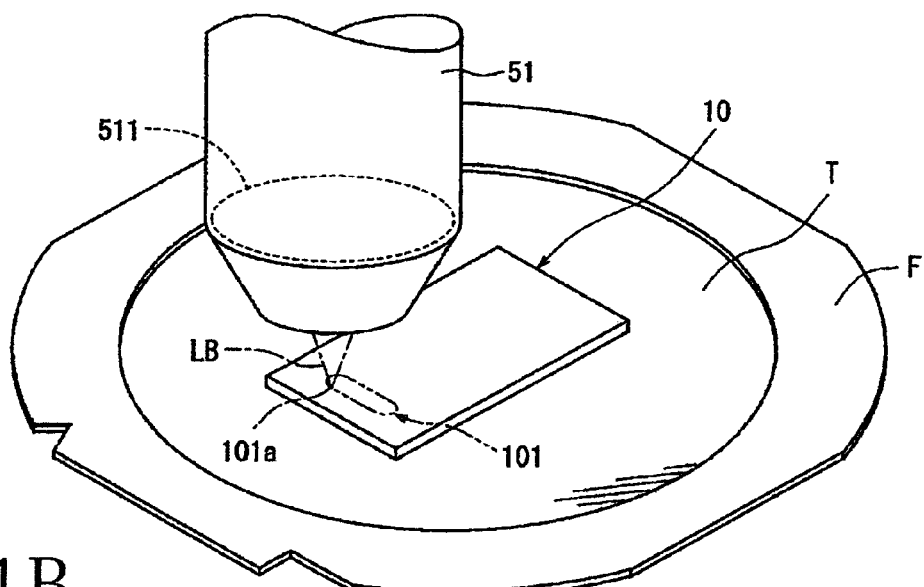
FIGS. 4A to 4D are diagrams of assistance in explaining a through hole contour forming step performed by the processing apparatus shown in FIG. 2.

After the above-described wafer holding step is performed, the first processing feed means 37 positions the chuck table 36 sucking and holding the plate-shaped object 10 directly under the imaging means 6. The imaging means 6 and the control means not shown in the figures then perform an alignment operation that detects the processing start position 101a of the contour 101 of the through hole to be formed which contour 101 is marked on the plate-shaped object 10. The control means then positions the processing start position 101a of the contour 101 of the through hole to be formed which contour 101 is marked on the plate-shaped object 10 held on the chuck table 36 directly under the condenser 51 of the laser beam irradiation means 5 as shown in FIG. 4A by operating the first processing feed means 37 and the second processing feed means 38. Next, focal point position adjusting means not shown in the figure is operated to move the condenser 51 in the direction of an optical axis so that a focal point P of a pulsed laser beam LB condensed by a condensing lens 51a of the condenser 51 is positioned at a desired position in a direction of thickness of the plate-shaped object 10 (positioning step). It is to be noted that in the present embodiment, the focal point P of the pulsed laser beam is set on an inside adjacent to a surface (undersurface) on an opposite side from a side (top surface side) on which the pulsed laser beam is made incident in the plate-shaped object 10.

After the positioning step is performed as described above, shield tunnel formation processing is performed which applies the pulsed laser beam LB from the condenser 51 by operating the laser beam irradiation means 5 to form shield tunnels by forming pores and amorphous substances shielding the pores between the focal point P positioned in the plate-shaped object 10 and the side on which the pulsed laser beam is made incident (top surface side). Specifically, the chuck table 36 is moved along the contour 101 of the through hole to be formed which contour 101 is marked on the plate-shaped object 10 by operating the first processing feed means 37 and the second processing feed means 38 while the pulsed laser beam LB of the wavelength capable of passing through the plate-shaped object 10 is applied from the condenser 51. Then, when the processing start position 101a has reached the position directly under the condenser 51, the application of the pulsed laser beam is stopped, and the operation of the first processing feed means 37 and the second processing feed means 38 is stopped to stop moving the chuck table 36.

Figure 4B:
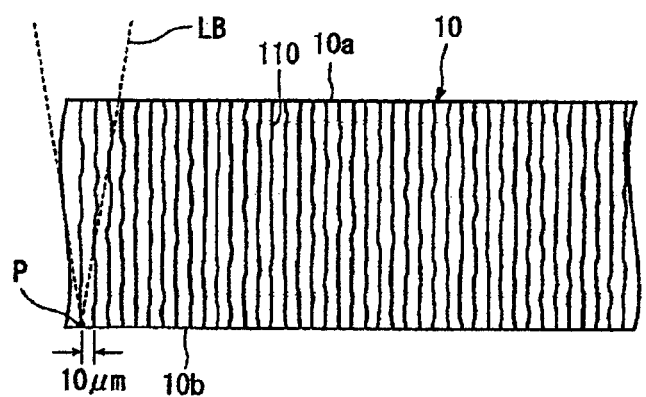
Figure 4C:
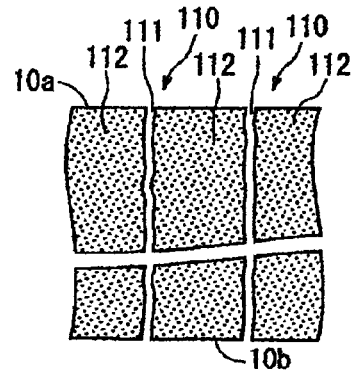
Figure 4D:
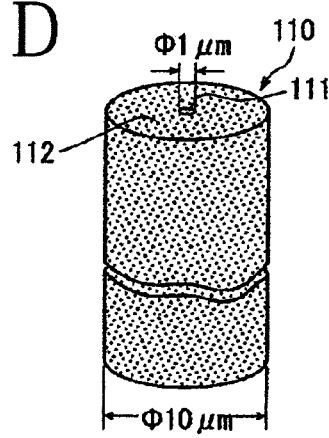

As a result of the above-described shield tunnel formation processing, as shown in FIG. 4B and FIG. 4C, pores 111 and an amorphous substances 112 formed around the periphery of the pores 111 grow from the undersurface (lower surface) side on which the focal point P of the pulsed laser beam LB is positioned to the top surface (upper surface) as an irradiated surface within the plate-shaped object 10, and amorphous shield tunnels 110 are formed at predetermined intervals (intervals of 10 µm (processing feed speed: 500 mm/second)/(repetition frequency: 50 kHz) in the present embodiment) along the contour 101 of the through hole to be formed which contour 101 is marked on the plate-shaped object 10. As shown in FIG. 4C and FIG. 4D, the shield tunnels 110 are each constituted of a pore 111 having a diameter of about 1 µm which pore 111 is formed in a center and an amorphous substance 112 having a diameter of 10 µm which amorphous substance 112 is formed around the periphery of the pore 111. The shield tunnels 110 in the present embodiment are formed such that the amorphous substances 112 adjacent to each other are continuous with each other. It is to be noted that because the amorphous shield tunnels 110 formed in the above-described shield tunnel formation processing can be formed from the undersurface (lower surface) side of the plate-shaped object 10 to the top surface (upper surface) as the irradiated surface of the plate-shaped object 10, it suffices to apply the pulsed laser beam once even in the case of a thick wafer, so that excellent productivity is achieved.

Figure 5:
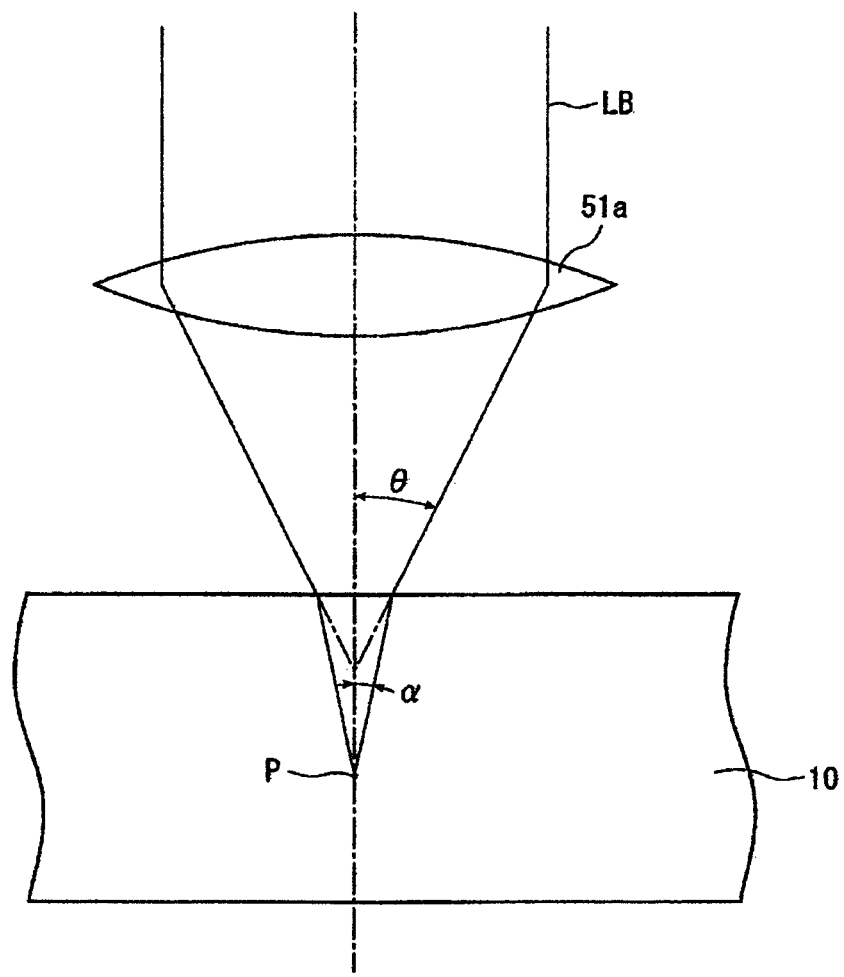
FIG. 5 is a diagram showing relation between the numerical aperture (NA) of a lens, the index of refraction (N) of the plate-shaped object, and a value obtained by dividing the numerical aperture (NA) by the index of refraction (N) (S=NA/N)

In order to form excellent shield tunnels 110 in the above-described shield tunnel formation processing, it is important that the numerical aperture (NA) of the condensing lens 51a be set such that the value (S) obtained by dividing the numerical aperture (NA) by the index of refraction (N) of a single crystal substrate is in a range of 0.05 to 0.2, as described above. A relation between the numerical aperture (NA), the index of refraction (N), and the value obtained by dividing the numerical aperture (NA) by the index of refraction (N) (S=NA/N) will be described in the following with reference to FIG. 5. The pulsed laser beam LB made incident on the condensing lens 51a in FIG. 5 is condensed at an angle ($\theta$) with respect to the optical axis of the condensing lens 51a. At this time, sine is the numerical aperture (NA) of the condensing lens 51a (NA=sine). When the plate-shaped object 10 formed of a single crystal substrate is irradiated with the pulsed laser beam LB condensed by the condensing lens 51a, the pulsed laser beam LB is refracted from the angle ($\theta$) to an angle ($\alpha$) and condensed to the focal point P because the single crystal substrate forming the plate-shaped object 10 has a higher density than air. At this time, the angle ($\alpha$) with respect to the optical axis of the condensing lens 51a differs according to the index of refraction (N) of the single crystal substrate forming the plate-shaped object 10. The index of refraction (N) is (N=sin $\theta$/sin $\alpha$). Thus, the value (S=NA/N) obtained by dividing the numerical aperture (NA) by the index of refraction (N) of the single crystal substrate is sin $\alpha$. Hence, it is important to set sin $\alpha$ in the range of 0.05 to 0.2 (0.05≤sin $\alpha$≤0.2).

Reasons that the value (S=NA/N) obtained by dividing the numerical aperture (NA) of the condensing lens 51a by the index of refraction (N) of a single crystal substrate is set in the range of 0.05 to 0.2 will be described in the following.
[Experiment 1-1]

Shield tunnels were formed in a sapphire ($Al_2O_3$) substrate (index of refraction: 1.76) having a thickness of 500 µm as the plate-shaped object 10 under the following processing conditions, and the quality of the shield tunnels was determined.

| Processing conditions | |
|---|---|
| Light source | YAG pulsed laser |
| Wavelength | 1064 nm |
| Repetition frequency | 50 kHz |
| Pulse width | 10 ps |
| Average output | 2 W |
| Condensed spot diameter | 10 µm |
| Processing feed speed | 500 mm/second |

| Numerical aperture (NA) of the condensing lens | Quality of the shield tunnels | S = NA/N |
|---|---|---|
| 0.05 | poor: none | |
| 0.1 | somewhat good | 0.057 |
| 0.15 | good | 0.085 |
| 0.2 | good | 0.114 |
| 0.25 | good | 0.142 |
| 0.3 | good | 0.170 |
| 0.35 | good | 0.198 |
| 0.4 | poor | 0.227 |
| 0.45 | poor: voids were formed | |
| 0.5 | poor: voids were formed | |
| 0.55 | poor: voids were formed | |
| 0.6 | poor: voids were formed | |

As shown above, shield tunnels are formed in a sapphire substrate (index of refraction: 1.76) by setting the numerical aperture (NA) of the condensing lens 51a condensing the pulsed laser beam such that the value (S=NA/N) obtained by dividing the numerical aperture (NA) by the index of refraction (N) of the single crystal substrate is in the range of 0.05 to 0.2. Hence, it is important to set the numerical aperture (NA) of the condensing lens 51a condensing the pulsed laser beam to 0.1 to 0.35 in the sapphire substrate (index of refraction: 1.76).
[Experiment 1-2]

Shield tunnels were formed in a silicon carbide (SiC) substrate (index of refraction: 2.63) having a thickness of 500 µm as the plate-shaped object 10 under the following processing conditions, and the quality of the shield tunnels was determined.

| Processing conditions | |
|---|---|
| Light source | YAG pulsed laser |
| Wavelength | 1064 nm |
| Repetition frequency | 50 kHz |
| Pulse width | 10 ps |
| Average output | 0.5 W |
| Condensed spot diameter | 10 µm |
| Processing feed speed | 500 mm/second |

| Numerical aperture (NA) of the condensing lens | Quality of the shield tunnels | S = NA/N |
|---|---|---|
| 0.05 | poor: none | |
| 0.1 | poor: none | |
| 0.15 | somewhat good | 0.057 |
| 0.2 | good | 0.076 |
| 0.25 | good | 0.095 |

-continued

| Numerical aperture (NA) of the condensing lens | Quality of the shield tunnels | S = NA/N |
|---|---|---|
| 0.3 | good | 0.114 |
| 0.35 | good | 0.133 |
| 0.4 | good | 0.152 |
| 0.45 | good | 0.171 |
| 0.5 | good | 0.19 |
| 0.55 | somewhat good | 0.209 |
| 0.6 | poor: voids were formed | |

As shown above, shield tunnels are formed by setting the value (S=NA/N) obtained by dividing the numerical aperture (NA) of the condensing lens 51*a* condensing the pulsed laser beam by the index of refraction (N) of the single crystal substrate in the range of 0.05 to 0.2 in the silicon carbide (SiC) substrate (index of refraction: 2.63). Hence, it is important to set the numerical aperture (NA) of the condensing lens 51*a* condensing the pulsed laser beam to 0.15 to 0.55 in the silicon carbide (SiC) substrate.

[Experiment 1-3]

Shield tunnels were formed in a quartz glass substrate (index of refraction: 1.45) having a thickness of 500 μm as the plate-shaped object 10 under the following processing conditions, and the quality of the shield tunnels was determined.

| Processing conditions | |
|---|---|
| Light source | YAG pulsed laser |
| Wavelength | 1064 nm |
| Repetition frequency | 50 kHz |
| Pulse width | 10 ps |
| Average output | 2 W |
| Condensed spot diameter | 10 μm |
| Processing feed speed | 500 mm/second |

| Numerical aperture (NA) of the condensing lens | Quality of the shield tunnels | S = NA/N |
|---|---|---|
| 0.05 | poor: none | 0.035 |
| 0.1 | good | 0.069 |
| 0.15 | good | 0.103 |
| 0.2 | good | 0.138 |
| 0.25 | good | 0.172 |
| 0.3 | somewhat good | 0.207 |
| 0.35 | poor: voids were formed | 0.241 |
| 0.4 | poor: voids were formed | 0.276 |

As shown above, shield tunnels are formed by setting the value (S=NA/N) obtained by dividing the numerical aperture (NA) of the condensing lens 51*a* condensing the pulsed laser beam by the index of refraction (N) of the single crystal substrate in the range of 0.05 to 0.2 in the quartz glass substrate (index of refraction: 1.45). Hence, it is important to set the numerical aperture (NA) of the condensing lens 51*a* condensing the pulsed laser beam to 0.1 to 0.25 in the quartz glass substrate (index of refraction: 1.45).

Experiment 1-1, Experiment 1-2, and Experiment 1-3 described above confirmed that shield tunnels are formed by setting the value (S=NA/N) obtained by dividing the numerical aperture (NA) of the condensing lens 51*a* condensing the pulsed laser beam by the index of refraction (N) of a single crystal substrate in the range of 0.05 to 0.2.

Description will next be made of another embodiment of the through hole contour forming step. The above-described shield tunnel processing has an advantage of being able to form shield tunnels from the top surface to the undersurface by applying the pulsed laser beam once. A through hole can be formed in the plate-shaped object along the formed shield tunnels by performing a through hole forming step to be described later.

Figure 6A:
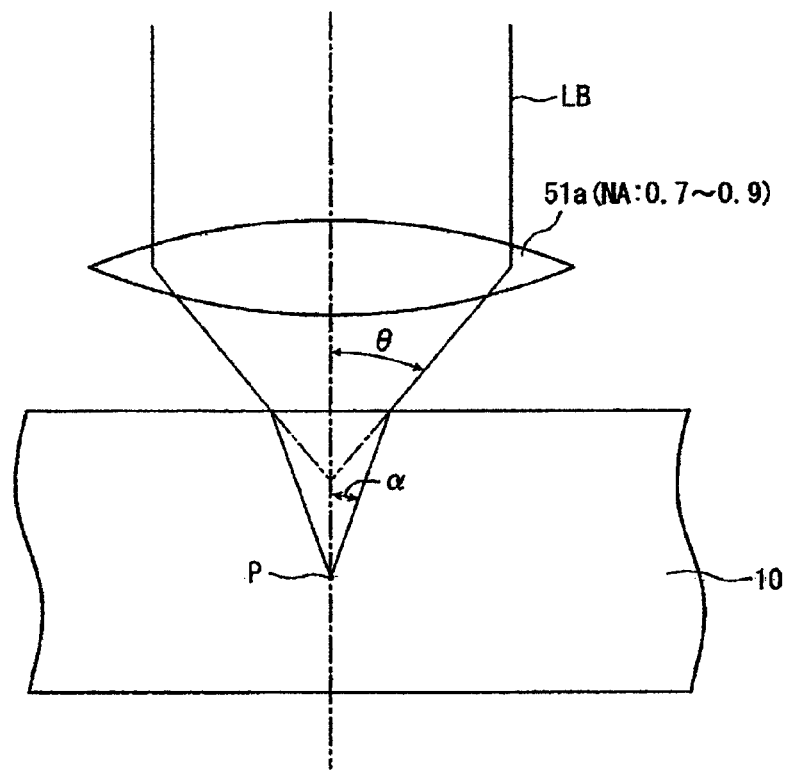
FIG. 6A and FIG. 6B are diagrams of assistance in explaining modified layer formation processing performed by the processing apparatus shown in FIG. 2.
Figure 6B:
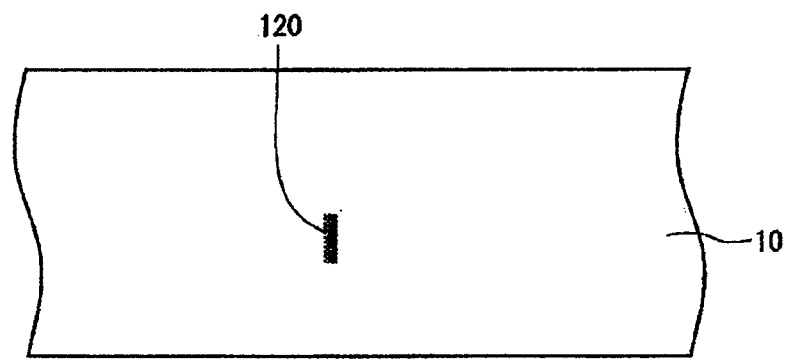

As another embodiment of the through hole contour forming step, a modified layer 120 serving as a break start point can be formed within the plate-shaped object 10 as shown in FIG. 6B by setting the numerical aperture (NA) of the condensing lens 51*a* to 0.7 to 0.9 and applying the pulsed laser beam with the focal point P located within the plate-shaped object as shown in FIG. 6A (modified layer formation processing).

Therefore, a through hole can be formed in the plate-shaped object along the formed modified layer by performing a through hole forming step to be described later after the modified layer is formed along the contour 101 of the through hole to be formed which contour 101 is marked on the plate-shaped object 10.

However, the depth of the modified layer formed by applying the pulsed laser beam once is about 30 μm. Thus, when the plate-shaped object has a thickness of 500 μm, the through hole can be formed by forming six or more modified layers in the direction of thickness of the plate-shaped object. The processing conditions for forming the modified layer in a sapphire substrate, a silicon carbide substrate, and a quartz glass substrate that have a thickness of 500 μm are the same, and processing is performed under the following processing conditions.

| Processing conditions | |
|---|---|
| Numerical aperture (NA) of the condensing lens | 0.8 |
| Light source | YAG pulsed laser |
| Wavelength | 1064 nm |
| Repetition frequency | 50 kHz |
| Pulse width | 10 ps |
| Average output | 2 W |
| Condensed spot diameter | 10 μm |
| Processing feed speed | 500 mm/second |
| Number of shots | 6 |

After the above-described through hole contour forming step is performed, a through hole forming step is performed which positions the ultrasonic transducer of the ultrasonic wave applying means in correspondence with the contour 101 of the through hole to be formed which contour 101 is marked on the plate-shaped object 10 that has been subjected to the through hole contour forming step, and applies an ultrasonic wave, and thereby breaks the contour of the through hole to be formed which contour is laser-processed by the shield tunnel formation processing, the modified layer formation processing or the like, to form the through hole in the plate-shaped object.

Figure 7A:
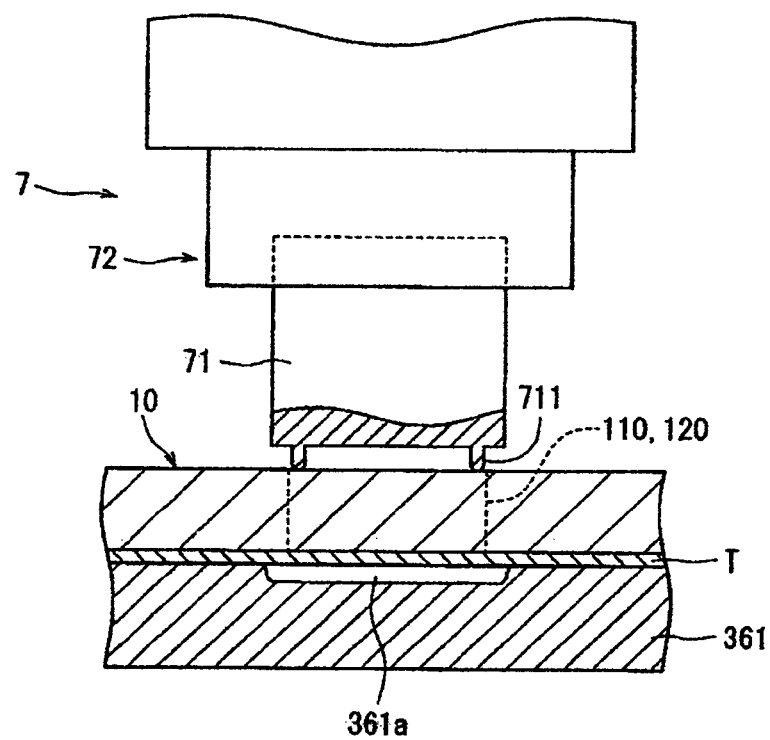
FIG. 7A and FIG. 7B are diagrams of assistance in explaining a through hole forming step performed by the processing apparatus shown in FIG. 2.
Figure 7B:
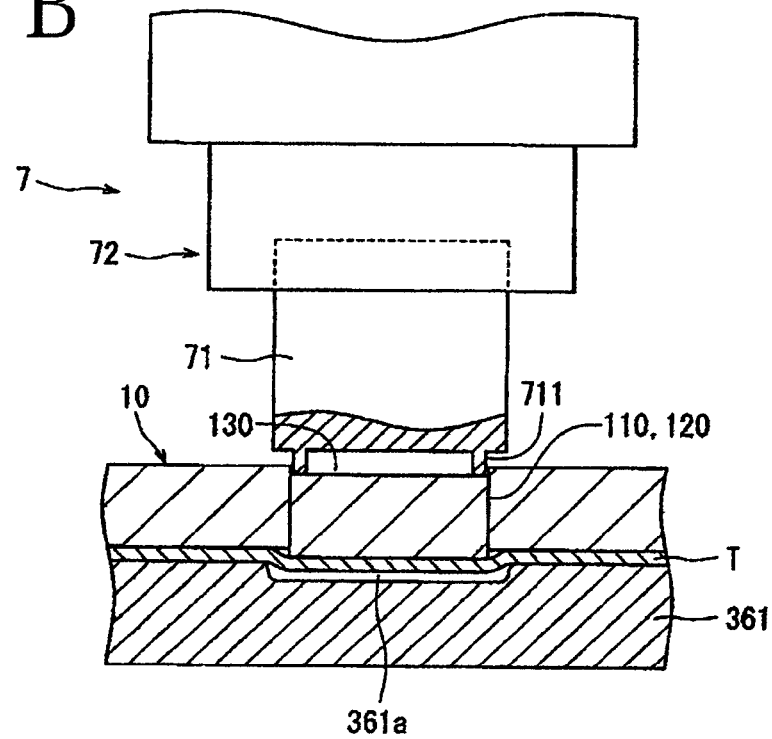

In order to perform this through hole forming step, the first processing feed means 37 and the second processing feed means 38 are operated to move the chuck table 36 to a processing region for processing by the ultrasonic wave applying means 7, and position the contour 101 of the through hole to be formed which contour 101 is marked on the plate-shaped object 10 held on the chuck table 36 directly under the ultrasonic transducer 71. Then, the raising and lowering means 72 is operated to lower the ultrasonic transducer 71. As shown in FIG. 7A, the vibrating terminal 711 is brought into contact in a corresponding manner with the contour 101 of the through hole to be formed which contour 101 is marked on the plate-shaped object 10, and the ultrasonic wave applying means 7 is operated to make the ultrasonic transducer 71 vibrate ultrasonically. An ultrasonic vibration is thereby applied in correspondence with the contour 101 of the through hole to be formed which contour 101 is marked on the plate-shaped object 10. As a result, as shown in FIG. 7B, the shield tunnels 110 or the modified layers 120 formed along the contour 101 of the through hole to be formed which contour 101 is marked on the plate-shaped object 10 are broken, and thus a through hole 130 is formed. At this time, because the relief recessed portion 361a slightly larger than the contour 101 of the through hole to be formed which contour 101 is marked on the plate-shaped object 10 is provided to the suction chuck 361 of the chuck table 36, the protective tape T to which the plate-shaped object 10 is stuck slightly enters the relief recessed portion 361a.

Incidentally, when the relief recessed portion 361a is not formed in the suction chuck 361 of the chuck table 36, the through hole forming step may be performed with a supporting substrate mounted on the suction chuck 361 of the chuck table 36, the supporting substrate being obtained by forming a relief recessed portion slightly larger than the contour 101 of the through hole to be formed which contour 101 is marked on the plate-shaped object 10 in the upper surface of a stainless steel plate, and coating the upper surface of the stainless steel plate with a silicon resin with a thickness of 2 mm to 3 mm.

Incidentally, the processing conditions of the through hole forming step are set as follows. Processing conditions of the through hole forming step:

| | |
|---|---|
| Ultrasonic transducer | lead zirconate titanate (PZT) |
| Output | 25 W |
| Repetition frequency | 20 kHz |
| Amplitude | 15 µm |
| Material of the vibrating terminal | titanium |
| Projection width of the vibrating terminal | 0.15 mm |

As described above, the plate-shaped object processing method in the foregoing present embodiment includes: a through hole contour forming step of performing laser processing for shield tunnels 110, modified layers 120 or the like within a plate-shaped object 10 along a contour 101 of a through hole to be formed, by positioning, within the plate-shaped object 10, the focal point of a pulsed laser beam of a wavelength capable of passing through the plate-shaped object 10 and applying the pulsed laser beam along the contour 101 of the through hole to be formed by pulsed laser beam irradiation means 5 including a condenser 51 for applying the laser beam; and a through hole forming step of breaking the laser-processed contour 101 of the through hole to be formed such as the shield tunnels 110, the modified layers 120 or the like, and forming a through hole 130 in the plate-shaped object 10, by positioning an ultrasonic transducer 71 of ultrasonic wave applying means 7 in correspondence with the contour 101 of the through hole to be formed in the plate-shaped object 10 resulting from the through hole contour forming step, and applying an ultrasonic wave. Thus, a through hole of a desired shape can be formed in a shorter time as compared with the above-described conventional processing method.

It is to be noted that while description in the foregoing embodiment has been made of an example in which the contour 101 of the through hole to be formed is formed in the plate-shaped object 10 in advance, the present invention can be carried out also in a plate-shaped object in which the contour 101 of the through hole to be formed is not formed. Specifically, the coordinates of the contour of the through hole to be formed in the plate-shaped object are stored in the memory of the control means in advance, and the laser beam is applied according to the coordinates of the contour with a predetermined position from an outer side of the plate-shaped object as a processing start position for applying the laser beam.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A plate-shaped object processing method forming a through hole of a desired shape in a plate-shaped object, the plate-shaped object processing method comprising:
    a through hole contour forming step of performing laser processing within the plate-shaped object along a contour of the through hole to be formed, by positioning, within the plate-shaped object, a focal point of a pulsed laser beam of a wavelength capable of passing through the plate-shaped object and applying the pulsed laser beam along the contour of the through hole to be formed by pulsed laser beam irradiation means including a condenser applying the laser beam; and
    a through hole forming step of breaking the laser-processed contour of the through hole to be formed and forming the through hole in the plate-shaped object by positioning an ultrasonic transducer of ultrasonic wave applying means in correspondence with the contour of the through hole to be formed in the plate-shaped object resulting from the through hole contour forming step and applying an ultrasonic wave.

2. The plate-shaped object processing method according to claim 1,
    wherein a value obtained by dividing a numerical aperture (NA) of a condensing lens of the condenser by an index of refraction (N) of the plate-shaped object is set in a range of 0.05 to 0.2, and
    the through hole contour forming step forms, along the contour of the through hole to be formed, shield tunnels in which pores and amorphous substances shielding the pores are grown between the focal point and a side on which the pulsed laser beam is made incident in the plate-shaped object, by positioning the focal point of the pulsed laser beam within the plate-shaped object and applying the pulsed laser beam along the contour of the through hole to be formed.

3. The plate-shaped object processing method according to claim 2,
    wherein the plate-shaped object is a quartz glass substrate, and the numerical aperture (NA) of the condensing lens of the condenser is set in a range of 0.1 to 0.025.

4. The plate-shaped object processing method according to claim 2,
    wherein the plate-shaped object is a sapphire substrate, and the numerical aperture (NA) of the condensing lens of the condenser is set in a range of 0.1 to 0.035.

* * * * *